(No Model.)
E. T. STARR.
MEANS FOR CONTROLLING ELECTRIC MOTORS.
No. 260,623.        Patented July 4, 1882.
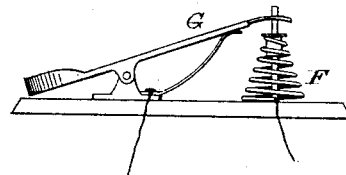
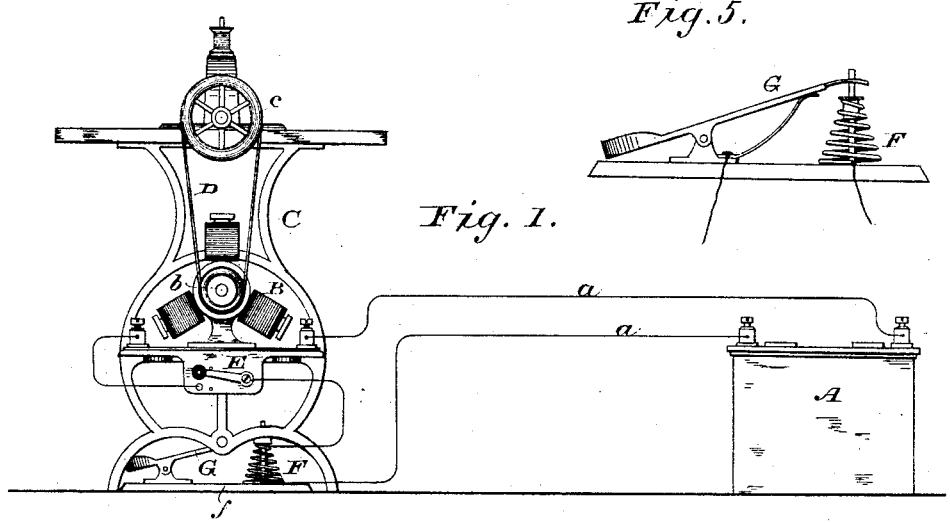
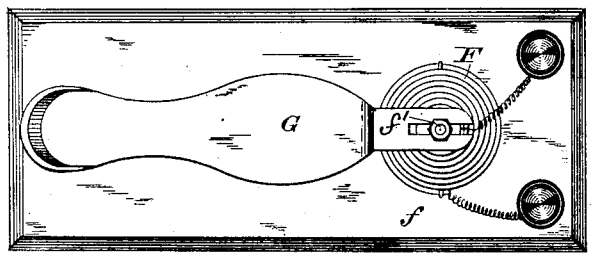
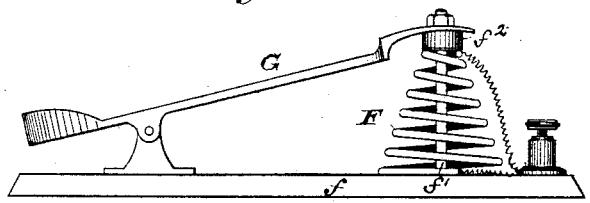
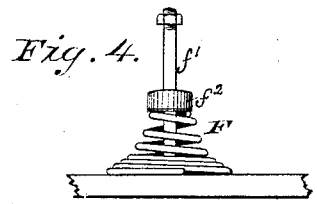
WITNESSES
Wm. A. Skinkle
Jos. S. Latimer
INVENTOR
Eli T. Starr,
By his Attorney
Wm. J. Peyton.

UNITED STATES PATENT OFFICE.

ELI T. STARR, OF PHILADELPHIA, PENNSYLVANIA, ASSIGNOR OF ONE-HALF TO WILLIAM J. PEYTON, OF WASHINGTON, DISTRICT OF COLUMBIA.

MEANS FOR CONTROLLING ELECTRIC MOTORS.

SPECIFICATION forming part of Letters Patent No. 260,623, dated July 4, 1882.

Application filed April 11, 1882. (No model.)

*To all whom it may concern:*

Be it known that I, ELI T. STARR, of the city and county of Philadelphia, in the State of Pennsylvania, have invented certain new and useful Improvements in Means for Controlling Electric Motors, of which the following is a specification.

My invention relates to devices for governing more especially the action of electro-magnetic motors employed for driving light machinery—such as sewing-machines, lathes, dental engines, &c.—whereby the speed and power of the machine being driven may be readily controlled by the operator. Various forms of devices have heretofore been suggested for this purpose, but none are as simple and efficient as is desirable.

The object of my present invention more especially is to provide an improved electro-magnetic motor controller or governor which will be comparatively simple and inexpensive, while exceedingly efficient, and capable of placing the working of the machine driven by the motor within the easy and complete control of the operator.

The subject-matter claimed is particularly pointed out at the close of the specification.

Some of my improvements may be used without the others and in connection with electric circuits not including electric motors.

In the accompanying drawings, which show my said improvements as organized in the best way now known to me—

Figure 1 is a side view of an arrangement on circuit organized according to my invention, there being shown the source of electricity, the electric motor, the machine to be driven by said motor, and the devices for controlling the speed of said machine by governing the flow of the electric current to the motor. Fig. 2 is a plan or top view of the current-controlling devices, and Fig. 3 is a side view thereof. Fig. 4 is a view of said controller partially depressed to throw out a portion of the resistance to the passage of the current. Fig. 5 is a view of a modification of the circuit-controlling devices.

In the drawings I have shown a secondary battery, A, which may be in the circuit of a main or charging line (not necessary to be shown) over which an electric current is conducted from a suitable generator to charge said battery. The battery may be cut out, either automatically or by hand, when charged, so as to constitute an independent source of electricity, if desired, in well-known ways. The working-circuit *a a* of said secondary battery A includes an electro-magnetic motor, B, which may be of any approved or suitable construction, and this motor may be either detached from the frame C of the machine to be driven or mounted thereon, as shown in Fig. 1. A belt-connection, D, passes from the driving-wheel *b* of the motor B over the pulley *c* of the machine to be driven, and when said motor is at work drives said machine, which in Fig. 1 of the drawings is represented as an ordinary domestic sewing-machine.

Any other suitable form of driving-connection may be employed between the motor and the machine to be driven.

A switch, E, in the organization shown in Fig. 1, forms part of the working-circuit connections between the battery or source of electricity and the motor B, and said switch is preferably arranged within convenient reach of the operator, so that the circuit may be readily made and broken to start or stop the machine. Said working-circuit also includes a resistance-coil, F, made in the form of a spring, by which the strength or effective force of the electric current flowing to the motor from the source of electricity may be regulated or determined by the expansion or contraction of said coil, so as to control the speed of said motor, and consequently also the speed and power of the machine being driven. Said spring resistance-coil is preferably made in the tapering or conical form shown in the drawings, with the coil of largest diameter next the base-board *f*, upon which the coil is mounted, and the successive coils or members gradually lessening in diameter to the apex or upper end of the coil, whereby upon pressure being applied to the smaller end of said coil to contract it its coils will contract and be brought into surface contact from its larger to its smaller end in regular order, the coils of the spring-resistance, in other words, gradually closing from its larger end to its smaller end, and thereby short-circuiting the current across the coils or members, as will be obvious, instead of compelling it to traverse the coil in a spiral direction from end to end, as will be the case when the coil is in its normal condition of full expansion. One terminal of the circuit-wires $a$ $a$ will, after leaving the motor, be connected with one end of the spiral coil, while the other terminal of said wires will be connected with the opposite end of the coil. Said spring resistance-coil is shown in Fig. 1 as located within the space formed by the side frames of the machine, its base-board resting upon the floor, so as to place the spring within convenient reach of the operator's foot. The upper end of the spring-coil is connected with the toe of an insulated treadle, G, pivoted to the base-board $f$, upon which treadle the foot of the operator is placed to contract by downward pressure the coil, so as to vary the resistance offered by the working-circuit to the passage of the current. By removing the pressure the spring immediately expands, so as to offer the maximum resistance, and at the same time return the treadle or lever to its normal position.

The maximum resistance of the coil should be sufficient to permit the passage through the circuit, when the circuit is completed by the switch E, of a current of just sufficient strength to drive the machine through the motor at a comparatively slow rate of speed. When greater speed and power is required, downward pressure of the foot may be employed to throw out a part of the resistance, more or less, as required, so that the motor, and consequently the machine, may readily be driven at the desired speed. When the resistance-coil is completely compacted or depressed the minimum resistance only is offered to the current, and the speed and power of the machine will consequently be at its maximum, and the extent of this range of resistance to be thrown in or cut out of the circuit will of course be determined to suit the particular circumstances under which it is desired to work.

It will thus be seen that I have produced a resistance-coil for electric circuits which may be compressed by force in one direction to lessen its resistance gradually and to any desired extent, and by its own action or resiliency return to its normal position to interpose its maximum resistance when the pressure is removed, this operation taking place without affecting the continuity of the current. This I believe to be a new and highly useful while very simple form of resistance device for electric circuits.

It will of course be understood that the expansible and contractible resistance-coil may be made in other forms than the tapering form shown. For example, the coils may be made of substantially the same diameter throughout, but of different power as respects their capacity to resist compression, whereby upon the application of pressure to compact the coil its respective coils will close gradually and in regular order. In some cases, also, the coil, instead of having the spring capacity in itself, may be made so as to be thrown outward after compression by a separate spring—for instance, an insulated spring inclosed by the coil. In some cases, also, the resistance-coil, with its members or coils adapted to gradually close to short-circuit the current across them, may lack the spring capacity, and be compressed and expanded positively in order to vary the resistance of an electric circuit.

I prefer in some instances to guide the resistance-coil in the expansion and contraction of its coils or members—as, for instance, by inserting within the coil the guide $f'$, on which the insulating-ring $f^2$ is fitted to slide freely, and fit the toe end of the treadle G thereto, so as to bear upon said ring by a slotted connection, (clearly shown in Fig. 2,) which organization of parts insures the proper working and gradual closing of the coils or members, and avoids any rocking of the coils or members relatively to each other, or lateral movement of said resistance-coil upon its base, due to the vibration of the treadle on its hinge or pivot.

In Fig. 5 I have shown a modified arrangement. The spring resistance-coil F is placed under the toe end of a pivoted treadle, G, the heel end of which is weighted; or the treadle is acted upon by a spring, so as to keep the toe end of the treadle nominally out of contact with the upper end of the resistance-coil F. The toe end of said treadle constitutes part of the circuit, so that when the said toe end of the treadle is depressed it makes contact with the resistance-coil, and thereby completes the circuit. Upon further depression of the toe end of the treadle more or less resistance may be cut out, due to the pressure upon the spring to compact it in the manner hereinbefore fully described.

It will thus be seen that the circuit is made and broken by the action of the foot upon the treadle, and that the resistance to be offered to the passage of the current is also controlled thereby, whereby the operation of the machine may be readily governed by the movement of the foot of the operator.

I am aware that a series of resistance-coils of the common form have been employed both with a foot-treadle and with a lever to control the resistance of an electric circuit; but in such cases the resistance to be cut out or thrown in is a positive predetermined quantity, and cannot be varied to any and slight degree, as in my invention.

I am also aware that resistance-coils forming part of an electric circuit have been suggested, in order to vary the resistance of the circuit by bringing more or less of the members of the coil into surface contact by pressure; but in such cases there is no provision for preventing several members of the coil from coming in contact at the same instance, and consequently the coils are defective in that a gradual resistance or closing of the members of the coil in succession or order, one after another, is not attained. By constructing the coil in a tapering form, (or with its members of gradually-decreasing diameter,) or in equivalent ways, a greatly superior coil is obtained, and one which permits the resistance of an electric circuit to be graduated or varied to a nice or slight degree.

I do not claim, however, in this present application the particular construction of the improved expansible and contractible spring resistance-coil for electric circuits, before described, as said particular form of spring resistance-coil and devices for working it will constitute the subject-matter of another application for Letters Patent to be made by me.

Having thus described the best ways known to me at present for carrying out my invention, what I do claim herein as new is—

1. The combination, substantially as hereinbefore set forth, of an electric circuit, an expansible and contractible spring resistance-coil to control the resistance of said circuit, and a pivoted treadle or lever movable in one direction on its pivotal connection to contract said spring-coil by pressure, while free to be returned to its normal position by the resilience of said spring when the pressure thereon is removed.

2. The combination, substantially as hereinbefore set forth, of an electric circuit, an electric motor connected in said circuit, a machine to be driven by said motor, an expansible and contractible spring resistance-coil forming part of said circuit, so as to control the resistance thereof, and a pivoted treadle movable in one direction on its pivotal connection to contract said spring-coil by pressure, while free to be returned to its normal position by the expansion of said spring when the pressure thereon is removed.

3. The combination, substantially as hereinbefore set forth, of an expansible and contractible resistance device, a guide therefor, and a pivoted treadle or lever connected with said device by a slotted or sliding connection, whereby the contraction and expansion of said resistance device takes place in a right line, notwithstanding the movement of the treadle around its pivot.

4. The combination, substantially as hereinbefore set forth, of an electric circuit, an expansible and contractible resistance device to control the resistance of said circuit, and a treadle or rest normally out of contact with said resistance device, so as to break said circuit, while capable of operation to close said circuit, and also determine the resistance to be offered to the passage of the current.

In testimony whereof I have hereunto subscribed my name this 8th day of April, A. D. 1882.

ELI T. STARR.

Witnesses:
E. EUGENE STARR,
JOHN URIAN.